July 24, 1951
A. J. MUSSELMAN
2,561,587
FORMING A CORD FABRIC STRIP WITH A TIRE
TREAD ATTACHED THERETO
Filed April 16, 1948
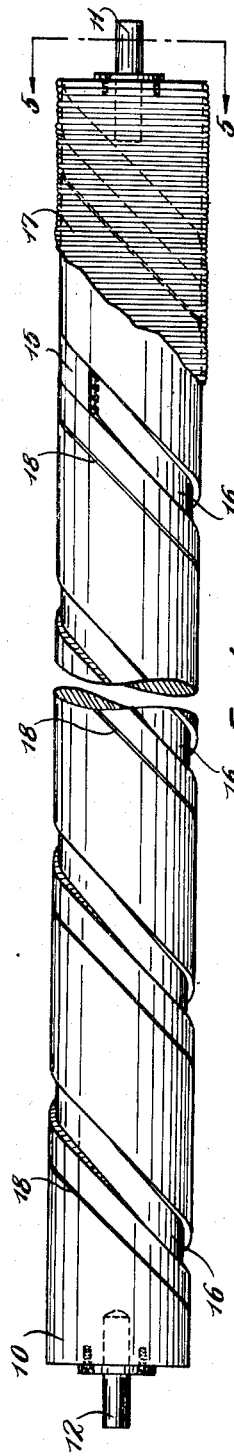
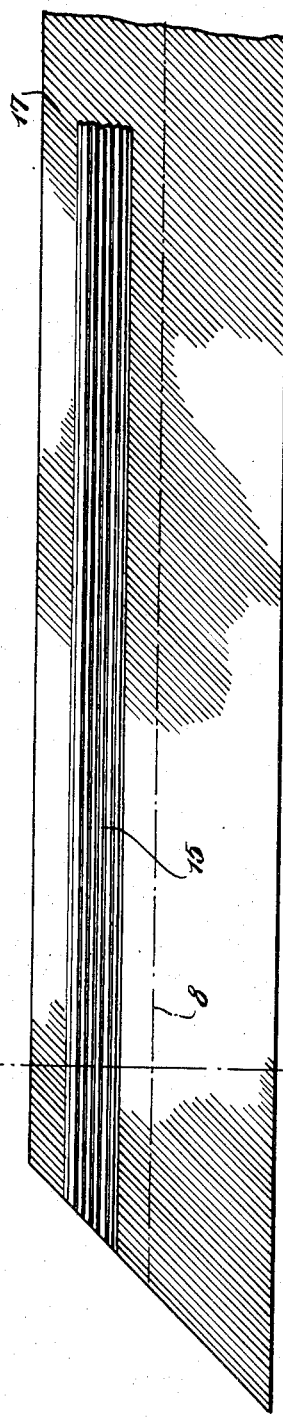
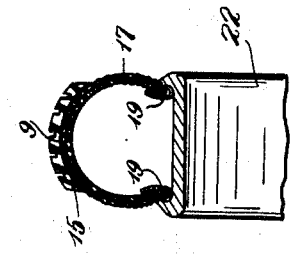
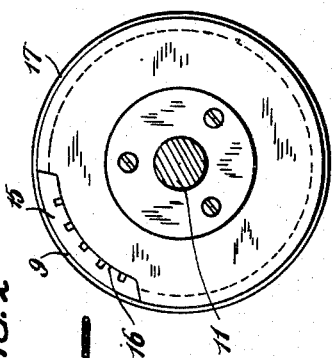
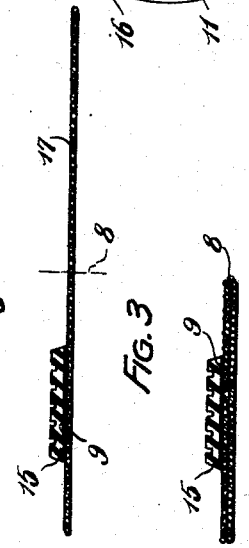
INVENTOR.
ALVIN J. MUSSELMAN
BY
Kwis, Hudson, Baughton & Williams
ATTORNEYS Patented July 24, 1951

2,561,587

UNITED STATES PATENT OFFICE 2,561,587

FORMING A CORD FABRIC STRIP WITH A TIRE TREAD ATTACHED THERETO

Alvin J. Musselman, Santa Barbara, Calif.; County National Bank and Trust Company of Santa Barbara, a national banking association, and Morris M. Musselman, executors of said Alvin J. Musselman, deceased Application April 16, 1948, Serial No. 21,515

4 Claims. (Cl. 154—92)

This invention relates to a method of making a tire fabric and tread. More particularly it has to do with a method in which the attachment of the tread to the fabric is effected as a part of the procedure of making the fabric, as distinguished from conventional methods in which the tread is attached to a completed fabric.

One of the objects of the invention is the simplification of the manufacture of tires for bicycles and other like vehicles.

Another object is the provision of a method of building tires for bicycles and the like which may be carried out largely by relatively unskilled labor but with uniformly excellent results.

Other objects and features of novelty will appear as I proceed with the description of that embodiment of the invention which, for the purposes of the present application, I have illustrated in the accompanying drawing, in which Fig. 1 is an elevational view partly in section and partly broken away showing a drum upon which the tire fabric is built, the drum being provided with a groove for accurately positioning the tread strip relative to the edges of the fabric strip.

Fig. 2 is a fragmental plan view on a larger scale of a fabric strip with tread attached, as constructed by means of my improved method.

Fig. 3 is a sectional view on the line 3—3 of Fig. 2 but on a still larger scale.

Fig. 4 is a view corresponding to Fig. 3 but with the strip folded longitudinally along its median line to provide a two-ply fabric of the desired width.

Fig. 5 is an end view of the drum with tread strip and cord winding mounted thereon, looking in the direction of arrows 5—5 of Fig. 1, but showing the parts on a larger scale; and Fig. 6 is a transverse sectional view of a completed casing on a bicycle rim.

In some of its aspects the method herein disclosed is an improvement over my copending application Serial No. 717,057 filed December 18, 1946. The tire fabric is built upon a drum shown herein at 10, which may be provided with trunnions 11 and 12 by means of which the drum may be mounted for rotation in suitable bearings. Suitable means are provided, as disclosed in the said pending application, for rotating the drum at the desired speed. The drum is so dimensioned that its circumference equals the length of the diagonal cords of the fabric to be built upon it, while the effective length of the drum is determined by a simple trigonometric formula using the circumferential dimension of the finished tire and the selected angle of the cords, this angle being chosen through experimentation to provide the desired qualities of strength and efficiency in the tire. Although the procedure for determining the length of the drum is as stated, and although the area of the fabric does not enter into the computation, it will be evident that the effective length of the drum may be otherwise stated to be the area of the fabric divided by the circumference of the drum, which is equivalent to the length of the cords.

As the first step of the method a tread strip 15, which may be of natural or synthetic rubber or of resilient plastic is wound spirally on the drum. In length it should be approximately equal to the circumference of the tire to be manufactured. It may have any desired width equal to or less than the width of the finished casing, and it may have any desired thickness which will provide the proper wearing and riding qualities in the tire. The drum may be marked to guide the operator in placing the tread correctly, but preferably it is provided with a groove 16 of the correct width to receive the tread strip and hold it in place. Preferably this groove is of the same depth substantially as the thickness of the tread so that when the tread strip is wound upon the drum its exposed surface will be flush with the surface of the drum, as indicated in Fig. 1. In practice the depth of the grove is about $\frac{1}{32}''$ less than the tread thickness, to assure firm contact between the cords and the tread strip. If the tread has an antiskid surface that surface is caused to face inward toward the bottom of the groove. Preferably the edges of the tread are bevelled somewhat as shown particularly in Figs. 3 and 4, and the sides of the groove are formed correspondingly. Any suitable means may be employed for securing the ends of the tread strip to the drum temporarily.

In accordance with the preferred procedure the surface of the tread strip which is exposed in the drum is coated with cement, indicated at 9 in the drawing. Preferably the cement coating is applied and is permitted to dry before the strip is mounted on the drum. Then with the drum rotatably mounted in a machine designed for the purpose, for example the machine disclosed in my aforesaid pending application, cord is reeled upon the drum to cover its complete surface, including the exposed surface of the tread strip. Such a winding is indicated at 17 in Fig. 1, it being broken away for the most part in that figure in order to illustrate more clearly the construction of the drum.

When the reeling of the cord is completed the succeeding steps may be performed in the reeling machine, or the drum may be removed from that machine and placed in a different machine, a new drum being mounted in the reeling machine and the heretofore described procedure repeated. In either case the area of cords overlying the tread strip 15 is saturated with a solvent for the cement previously applied to the tread strip. This solvent penetrates through and between the cords and reactivates the cement on the tread strip. When the solvent evaporates the cords become firmly cemented to the tread strip.

Thereafter the whole outer surface of the reeled cord is coated with a cord adhesive, preferably a rubber latex composition or rubber cement in fluid form. This coating is permitted to set, after which the fabric with the tread strip attached is cut spirally at the predetermined angle aforesaid, and is then stripped from the drum. To facilitate the cutting operation the drum may be provided with a continuous narrow slit or slot 18 cut at the same angle as groove 16 and spaced therefrom as indicated in Fig. 1. A knife can be run through the cord winding guided by this slot, and this may be done by means of special apparatus constructed for the purpose as shown for example in the said pending application.

A cross-section of the fabric strip with tread attached is illustrated in Fig. 3 as it is taken from the drum. Thereafter the strip is folded longitudinaly along its center line 8, so as to produce a two-ply fabric as illustrated in Fig. 4. The two plies are then pressed together with hand rollers, the cord adhesive previously applied bonding them together. The ends of the tread strip are then cut flush with the ends of the fabric strip. After the fabric ends are joined a small quantity of cement is spread on the ends of the tread strip and they are left in contact until the cement dries to form a bond between them. Bead wires 19 are then cut to the proper length and their ends welded together to form rings which are sewed to the fabric. A cross-section of the completed casing mounted upon a bicycle rim 22 is shown in Fig. 6.

Some variation from the described procedure is permissible. For example the tread strip need not necessarily be coated with cement and dried before it is wound around the drum or after it is on the drum and before the cord is wound. In such case the uncoated tread strip may be mounted on the drum, the cord wound around the drum and tread strip and a fluid adhesive applied to that part of the winding which covers the tread strip. The adhesive then penetrates through and between the cords to reach the tread strip, and when it dries the tread is firmly attached to the cords. Also, even though the tread strip is coated with cement in advance the application of a solvent may be omitted, and in its place a further coating of the same cement may be applied to that part of the cord winding which covers the tread strip.

Having thus described my invention, I claim:

1. The method of forming on a drum a cord fabric strip with a tire tread attached thereto, the drum having a circumference dimension equal to the desired length of the diagonal cords and an effective length dimension equal to the area of the strip divided by the length of said cords, which consists in winding a tire tread on said drum diagonally at a selected angle with the tread surface facing the drum, reeling cord on said drum to completely cover the tire tread and drum, applying a fluid adhesive to said tread and said cords, permitting the adhesive to set and cutting said reeled cord spirally at said selected angle between the convolutions of said tread.

2. The method of forming on a drum a cord fabric strip with a tire tread attached thereto, the drum having a circumference dimension equal to the desired length of the diagonal cords and an effective length dimension equal to the area of the strip divided by the length of said cords and having a groove of width and depth dimensions substantially the same as those of said tread and disposed diagonally at a selected angle, which consists in mounting a tread strip in said groove with the tread surface facing the bottom of the groove, reeling cord on said drum to completely cover the tread strip and drum, applying a fluid adhesive to said tread strip and said cord winding, permitting the adhesive to set, and cutting said reeled cord spirally at said selected angle between the convolutions of said tread strip.

3. The method of forming on a drum a cord fabric strip with a tire tread attached thereto, the drum having a circumference dimension equal to the desired length of the diagonal cords and an effective length dimension equal to the area of the strip divided by the length of said cords, which consists in winding a tread strip on said drum diagonally at a selected angle with the tread surface facing the drum, applying cement to the exposed surface of said tread strip, reeling cord on said drum to completely cover the tread strip and drum, applying a solvent freely to said cords over the area of said tread strip to penetrate through and between said cords and contact the said cement, permitting the solvent to evaporate, applying a fluid adhesive to said cords, permitting the adhesive to set, and cutting said reeled cord spirally at said selected angle between the convolutions of said tread strip.

4. The method of forming on a drum a cord fabric strip with a tire tread attached thereto, the drum having a circumference dimension equal to the desired length of the diagonal cords and an effective length dimension equal to the area of the strip divided by the length of said cords and having a groove of width and depth dimensions approximately the same as those of said tread strip and disposed spirally at a selected angle, which consists in mounting a tread strip in said groove with the tread surface facing the bottom of the groove, applying cement to the exposed surface of said tread strip, reeling cord on said drum to completely cover the tread strip and drum, applying a solvent freely to said cords over the area of said tread strip to penetrate through and between the cords and contact the cement on the tread strip, permitting the solvent to evaporate, applying a fluid adhesive to said cords, permitting the adhesive to set, and cutting said reeled cord spirally at said selected angle between the convolutions of said tread strip.

ALVIN J. MUSSELMAN.

REFERENCES CITED

The following references are of record in the file of this patent:

UNITED STATES PATENTS

| Number | Name | Date |
| --- | --- | --- |
| 684,157 | Williams | Oct. 8, 1901 |
| 1,337,690 | Converse et al. | Apr. 20, 1920 |
| 1,519,522 | Weigel | Dec. 16, 1924 |
| 1,604,273 | Gammeter | Oct. 26, 1926 |
| 2,047,999 | Eger | July 21, 1936 |